(12) United States Patent
Perez-Pena

(10) Patent No.: US 9,090,506 B2
(45) Date of Patent: *Jul. 28, 2015

(54) METHOD FOR IN-SITU MANUFACTURE OF A LIGHTWEIGHT FLY ASH BASED AGGREGATE

(71) Applicant: United States Gypsum Company, Chicago, IL (US)

(72) Inventor: Marianela Perez-Pena, Grayslake, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/317,769

(22) Filed: Jun. 27, 2014

(65) Prior Publication Data

US 2014/0305342 A1    Oct. 16, 2014

Related U.S. Application Data

(62) Division of application No. 13/232,128, filed on Sep. 14, 2011, now Pat. No. 8,795,429.

(60) Provisional application No. 61/428,819, filed on Dec. 30, 2010.

(51) Int. Cl.
  *C04B 11/00*  (2006.01)
  *C04B 18/02*  (2006.01)

(52) U.S. Cl.
  CPC .............. *C04B 18/027* (2013.01); *C04B 18/021* (2013.01)

(58) Field of Classification Search
  CPC ..................................................... C04B 11/00
  USPC ............................ 106/772, 778, 705, DIG. 1
  See application file for complete search history.

(56) References Cited

U.S. PATENT DOCUMENTS

| | | | |
|---|---|---|---|
| 4,054,461 A * | 10/1977 | Martin | .......................... 106/717 |
| 4,488,909 A | 12/1984 | Galer et al. | |
| 4,494,990 A | 1/1985 | Harris | |
| 5,064,292 A | 11/1991 | Sutton | |
| 5,490,889 A | 2/1996 | Kirkpatrick et al. | |
| 5,536,310 A | 7/1996 | Brook et al. | |
| 5,536,458 A | 7/1996 | Kawakita et al. | |
| 5,997,632 A | 12/1999 | Styron | |

(Continued)

OTHER PUBLICATIONS

International Search Report mailed May 4, 2012 in PCT application No. PCT/US2011/064561.

(Continued)

*Primary Examiner* — Paul Marcantoni
(74) *Attorney, Agent, or Firm* — Novak Druce Connolly Bove + Quigg LLP; Pradip Sahu; Philip T. Petti

(57) ABSTRACT

A method of making a rapid setting lightweight homogeneous foamed fly ash based cementitious aggregate composition with improved compressive strength for products such as panels is disclosed. The method mixes fly ash, alkali metal salt of citric acid, foaming agent for entraining air, optional foam stabilizing agent, a calcium sulfate such as stucco or gypsum, and water. Compositions are also disclosed which include mixtures of fly ash, particularly Class C fly ash alone or in mixtures with Class F fly ash, alkali metal salts of citric acid, foaming agents, a calcium sulfate such as calcium sulfate dihydrate or hemihydrate and an optional portland cement.

19 Claims, 11 Drawing Sheets

(56) References Cited

U.S. PATENT DOCUMENTS

| | | |
|---|---|---|
| 6,827,776 B1 | 12/2004 | Boggs et al. |
| 6,869,474 B2 | 3/2005 | Perez-Pena et al. |
| 7,651,564 B2 * | 1/2010 | Francis .................. 106/708 |
| 7,670,427 B2 | 3/2010 | Perez-Pena et al. |
| 8,070,878 B2 * | 12/2011 | Dubey ..................... 106/713 |
| 8,551,241 B2 * | 10/2013 | Perez-Pena ............... 106/705 |
| 2004/0040474 A1 | 3/2004 | Perez-Pena |
| 2007/0079733 A1 | 4/2007 | Crocker |
| 2010/0071597 A1 * | 3/2010 | Perez-Pena ............... 106/708 |
| 2012/0172469 A1 * | 7/2012 | Perez-Pena .................. 521/83 |

OTHER PUBLICATIONS

Written Opinion of the International Searching Authority mailed May 4, 2012 in PCT application No. PCT/US2011/064561.

International Preliminary Report on Patentability of Jul. 2, 2013 for PCT International Application No. PCT/US2011/064561 to United States Gypsum Company, International Filing Date Dec. 13, 2011.

* cited by examiner

METHOD FOR IN-SITU MANUFACTURE OF A LIGHTWEIGHT FLY ASH BASED AGGREGATE

CROSS REFERENCE TO RELATED APPLICATIONS

This application is a Divisional of U.S. application Ser. No. 13/232,128, filed Sep. 14, 2011, which claims the benefit of U.S. Provisional Application No. 61/428,819, filed Dec. 30, 2010, both of which are incorporated herein by reference in their entirety and is related to:

U.S. Provisional Application No. 61/428,839 entitled Lightweight Foamed Fly Ash Binders, filed Dec. 30, 2010; incorporated herein by reference in its entirety.

FIELD OF THE INVENTION

This invention relates generally to fast setting cementitious compositions that can be used for a variety of applications in which rapid hardening and attainment of early strength is desirable. In particular, the invention relates to a method of making a homogenous lightweight fly ash based cementitious aggregate composition which has properties similar to expanded clay aggregates and lightweight fillers that can be used to make boards with excellent moisture durability for use in wet and dry locations in buildings. These aggregates plus a pre-formed foam are added to a fast setting cementitious mixture so that precast board products can be handled soon after the cementitious mixture is poured into a stationary or moving form or over a continuously moving belt. Ideally, this setting of the cement mixture may be achieved as soon as about 20 minutes, preferably as soon as 10 to 13 minutes, more preferably as soon as 4 to 6 minutes, after mixing the cement mixture with a suitable amount of water.

BACKGROUND OF THE INVENTION

U.S. Pat. No. 6,869,474 to Perez-Pena et al, incorporated herein by reference, discusses extremely fast setting of cementitious compositions for producing cement-based products such as cement boards achieved by adding an alkanolamine to hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash. The extremely rapid set permits rapid production of cementitious products. Triethanolamine additions have been found to be a very powerful accelerator capable of producing formulations with relatively short final setting times with increased levels of fly ash and gypsum and without the need of calcium aluminate cements. However, formulations with triethanolamine contain mainly hydraulic cements such as portland cement and gypsum as the reactive powder, which limits the availability of aluminate phases compared to the aluminate phases produced by the activation of fly ash materials in the present invention.

Pending U.S. patent application Ser. No. 11/758,947 filed Jun. 6, 2007 of Perez-Pena et al, incorporated herein by reference, discusses extremely fast setting of cementitious compositions with early-age compressive strength for producing cement-based products such as cement boards achieved by adding an alkanolamine and a phosphate to a hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash. Again, all of the compositions contained a significant amount of hydraulic cement and gypsum.

Pending U.S. patent application Ser. No. 12/237,634 filed Sep. 25, 2008 of Perez-Pena discloses formulations using fly ash and alkali metal salts of citric acid such as sodium citrate to form concrete mixes with fast setting time and relatively high early age compressive strength. One of the challenges encountered with the activated fly ash binders described in this application, is an apparent pessimum interaction between these binders and the traditional foaming systems used to entrain air and thereby make lightweight boards. The fly ash based binders which have been made with traditional foams in accordance with this disclosed method have suffered foam collapsing and/or drastic strength reduction.

U.S. Pat. No. 4,488,909 to Galer et al, incorporated herein by reference, discusses cementitious compositions capable of rapid setting. The compositions permit high speed production of carbon dioxide resistant products by forming essentially all of the potential ettringite within about 20 minutes after the composition is mixed with water. The essential components of the cementitious composition are portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement, which in combination with the other components makes possible the early formation of ettringite and other calcium aluminate hydrates responsible for early setting of the cementitious mixture. In their invention, Galer et al provided aluminates using high alumina cement (HAC) and sulfate ions using gypsum to form ettringite and achieve rapid setting of their cementitious mixture.

Ettringite is a calcium aluminum sulfate compound having the formula $Ca_6Al_2(SO_4)_3.32H_2O$ or alternatively 3 $CaO.Al_2O_3.3CaSO_4.32H_2O$. Ettringite forms as long needle-like crystals and provides rapid early strength to cement boards, so that they can be handled soon after being poured into a mold or over a continuous casting and forming belt.

In general, Galer et al's rapid setting formulation suffers from several limitations. These limitations, as highlighted below, are even more of a concern for the production of low cost concrete products such as lightweight aggregates because it uses relatively expensive high alumina cements to provide aluminate phases.

U.S. Pat. No. 5,536,310 to Brook et al disclose a cementitious composition containing 10-30 parts by weight (pbw) of a hydraulic cement such as portland cement, 50-80 pbw fly ash, and 0.5-8.0 pbw expressed as a free acid of a carboxylic acid such as citric acid or alkali metal salts thereof, e.g., tripotassium citrate or trisodium citrate, with other conventional additives, including retarder additives such as boric acid or borax, which are used to accelerate the reaction and setting time of the composition to overcome the disclosed disadvantageous of using a high fly ash content in cement compositions.

U.S. Pat. No. 5,536,458 to Brook et al disclose a cementitious composition containing a hydraulic cement such as portland cement, 70-80 parts by weight fly ash, and 0.5-8.0 pbw of a free carboxylic acid such as citric acid or an alkali metal salts thereof e.g. potassium citrate or sodium citrate, with other conventional additives including retarder additives such as boric acid or borax, which are used to accelerate the reaction and setting time of the composition to overcome the known disadvantageous of using a high fly ash content in cement compositions.

U.S. Pat. No. 4,494,990 to Harris discloses a cementitious mixture of portland cement e.g. 25-60 pbw, fly ash e.g. 3-50 pbw and less than 1 pbw of sodium citrate.

U.S. Pat. No. 6,827,776 to Boggs et al disclose a hydraulic cement composition comprising portland cement, fly ash, which has a setting time controlled by pH of an activator slurry of an acid, preferably citric acid, and a base which can be an alkali or alkaline earth metal hydroxide or salt of the acid component.

U.S. Pat. No. 5,490,889 to Kirkpatrick et al disclose a blended hydraulic cement consisting of water, fly ash (50.33-83.63 pbw), portland cement, ground silica, boric acid, borax, citric acid (0.04-2.85 pbw) and an alkali metal activator, e.g. lithium hydroxide (LiOH) or potassium hydroxide.

U.S. Pat. No. 5,997,632 to Styron discloses a hydraulic cement composition containing 88-98 wt. % fly ash, 1-10 wt. % portland cement and from about 0.1-4.0 wt. % citric acid. Lime to achieve a desirable minimum lime content of 21% is provided by the subbituminuous fly ash or the sub-bituminous fly ash in combination with a beneficiating agent. In addition to citric acid Styron uses an alkali source such as potassium or sodium hydroxide.

The final setting times of the cementitious mixtures of prior art products are typically greater than 9 minutes and can extend to 2-3 hours for standard concrete products. The final setting time is normally defined as the time in which the cementitious mixtures set to the extent that the concrete products made thereof can be handled and stacked, although chemical reactions may continue for extended periods.

There is a need to find a method to reduce the weight of fly ash based binder mixes so these formulations can be used to manufacture of lightweight cementitious concrete products for applications such as backer board and other wall or ceiling applications with improved strength. The present method has developed formulations with enhanced compressive strength at reduced weight and with reduced cost.

When lightweight concrete is made, a lightweight aggregate like expanded clay or perlite is generally used rather than sandy gravel or crushed stone. The expanded clay/perlie particles (nodules) are produced by a sophisticated pyrogenic process whereby geochemically specific clay or perlite is expanded in a rotary kiln at high temperatures. The expanded clay or perlite particles are extremely lightweight granular aggregate with a hard vitrified outer shell and an air filled honeycombed inner core. The expansion of the combined water in the crude clay or perlite (rock), results from the rapid heating of the crude rock to temperatures above 1600° F. (871° C.), when the rock cracks and combined water vaporizes like popped corn.

The present invention provides a method of making fast setting cementitious slurry used to manufacture lightweight aggregate particles (nodules) at a relatively low temperature. The lightweight aggregate particles (nodules) can form in situ in a cementitious mixture. Setting the mixture results in a solid product comprising particles (nodules) formed in situ in the matrix of cementitious material. This product can be used as is or crushed to form loose lightweight aggregate particles.

The particles are extremely lightweight with a hard outer cementitious shell with an air filled crystalline inner core. The lightweight particles provide a low energy, low cost lightweight filler which is ideal for manufacturing lightweight cement panels, block or other lightweight concrete articles.

The invention also provides a lightweight cementitious composition with reduced weight and enhanced early and final compressive strength. The cementitious composition is formed from a foamed binder solution containing sodium citrates, sodium silicates, foaming agents, foam stabilizer and a reactive powder comprising Class C fly ash and calcium sulfate.

The present invention includes a method of providing a lightweight cementitious mixture having rapid set, improved compressive strength and water durability comprising: mixing at ambient or above ambient temperatures, water, cementitious reactive powder, a set accelerating amount of alkali metal salt of citric acid, and in situ forming a reactive powder lightweight aggregate, wherein the weight ratio of water to reactive powder solids is about 0.17 to 0.35:1.0, or about 0.17 to 0.27:1.0, and more preferably about 0.20 to 0.25:1.0. The cementitious reactive powder comprises fly ash. and a calcium sulfate selected from the group consisting of calcium sulfate hemihydrate, calcium sulfate dihydrate, and mixtures thereof, and preferably no hydraulic cement, e.g., no portland cement. Typically essentially 100 wt. of the fly ash is in the form of class C fly ash and blends of class C and class F fly ash. For purposes of the present specification cements are characterized as hydraulic or non-hydraulic. Hydraulic cements (e.g., Portland cement) harden because of hydration, chemical reactions that occur independently of the mixture's water content; they can harden even underwater or when constantly exposed to wet weather. The chemical reaction that results when the anhydrous cement powder is mixed with water produces hydrates that are not water-soluble. Non-hydraulic cements (e.g., lime, stucco, gypsum/landplaster and gypsum plaster) must be kept dry to retain their strength. Typically the mixture has a wet (water included) density of about 40 to 65 pounds per cubic foot, for example, 46 to 51 pounds per cubic foot.

The method generally further includes setting the mixture to form a solid product containing the in situ formed aggregate particles. The solid product can be used as is or can be broken up, for example by crushing, to form loose aggregate particles of the present invention.

This cementitious reactive powder includes at least fly ash and stucco or gypsum/landplaster (stucco is calcium sulfate hemihydrate, gypsum is calcium sulfate dihydrate) and may also contain ordinary portland cement (OPC), calcium aluminate cement (CAC) (also commonly referred to as aluminous cement or high alumina cement), and a non-fly ash mineral additive. However, typically there is no added ordinary portland cement (OPC) or calcium aluminate cement (CAC).

Class C fly ash generally contains lime. Thus, the reactive powder blend of the cementitious composition is typically free of externally added lime.

The preferred initial slurry temperatures are from room temperature to about 100° F.-115° F. (24° C. to about 38°-46° C.).

The final setting time (i.e., the time after which cementitious boards can be handled) of the cementitious composition as measured according to the Gilmore needle should be at most 20 minutes, preferably 10 to 13 minutes or less, more preferably about 4 to 6 minutes after being mixed with a suitable amount of water. A shorter setting time and higher early age compressive strength helps to increase the production output and lower the product manufacturing cost.

The very fast setting cementitious compositions of this invention can be used for a variety of applications in which rapid hardening and attainment of early strength is desirable. Using the alkali metal salt of citric acid, such as potassium citrate and/or sodium citrate, to accelerate setting of the cementitious composition, when the slurry is formed at elevated temperatures, makes possible increased rate of production of cementitious products such as cement boards.

The dosage of alkali metal citrate in the slurry is in the range of about 1.5 to 6 wt. %, preferably about 1.5 to 4.0 wt. %, more preferably about 2 to 3.5 wt. %, and most preferably about 3.5 wt. % based on the cementitious reactive components of the invention. Sodium citrates are preferred, although potassium citrate or a blend of sodium and potassium citrate can be used. As mentioned above, these weight percents are based on 100 parts by weight of the reactive components (cementitious reactive powder). Thus for example, for 100 pounds of cementitious reactive powder, there may be about 1.5 to 4.0 total pounds of sodium citrates.

A typical cementitious reactive powder of this invention comprises 75 to 100 wt % fly ash and 0 wt. % hydraulic cement. Typically at least half of the fly ash is Type C fly ash.

A cementitious reactive powder of this invention can also comprise class F fly ash up to 46 wt % when mixed with a sufficient amount of class C fly ash, sodium citrate and optional Portland cement of 0 to 20 wt % to make up for the lower compressive strength of the class F fly ash compared to the higher alumina and lime content of the preferred class C fly ash. When higher amounts of class F fly ash are used, i.e. up to 60 wt % of the reactive powder, it has been found the lower compressive strength of the class F fly ash can not be sufficiently increased by only adding class C fly ash to the class F fly ash. Thus, although not preferred, class F fly ash can be used in amounts up to about 60 wt % if Portland Cement, e.g. Type III Portland cement, is used with the class F fly ash to increase the compressive strength by addition of alumina and lime beyond the levels typical found in Class C fly ash. Thus, for example, 46 to 60 wt % class F fly ash could be used with 10 to 32 wt % class C fly ash without compromising compressive strength if about 10 to 29 wt % of additional Type III Portland cement is also used with the fly ash mixture and 2-4 wt. % sodium citrate.

There is a synergistic interaction between the alkali metal citrate and the fly ash. In particular, adding alkali metal citrates to fly ash improves mix fluidity unlike other accelerators such as aluminum sulfate, which can lead to premature stiffening of concrete mixtures.

Other additives, e.g., inert aggregate, may also be present, which are not considered cementitious reactive powder, but are part of the overall cementitious composition. Such other additives include one or more of sand, aggregate, lightweight fillers, water reducing agents such as superplasticizers, set accelerating agents, set retarding agents, air-entraining agents, foaming agents, shrinkage control agents, slurry viscosity modifying agents (thickeners), coloring agents and internal curing agents, may be included as desired depending upon the process ability and application of the cementitious composition of the invention.

The lightweight cementitious compositions of the present invention can be used to make precast concrete building products such as cementitious boards with excellent moisture durability for use in wet and dry locations in buildings. The precast concrete products such as cement boards are made under conditions which provide a rapid setting of the cementitious mixture so that the boards can be handled soon after the cementitious mixture is poured into a stationary or moving form or over a continuously moving belt.

The lightweight cementitious compositions can be used in any concrete product application including concrete panels, flooring, overlays, finishes, capping, as well as patching mixes for concrete roads. The concrete products made with the lightweight compositions of this invention have particular advantages for use which require water durability compared to compositions which contain gypsum and applications which require higher compressive strength than cement containing compositions which have a higher carbon foot print.

Fly ash material is mostly aluminosilicates. Thus, it is theorized the lightweight aggregate of the invention may be similar to that of the most expensive perlite or expanded clay aggregate.

All percentages, ratios and proportions herein are by weight, unless otherwise specified.

BRIEF DESCRIPTION OF THE DRAWINGS

FIG. 8a and FIG. 8b are SEM photographs showing inside aggregate particle similar microstructure as compared to outside (FIG. 7) but relatively denser packing, wherein FIG. 8a is a Secondary electron image and FIG. 8b is a Backscatter electron image.

FIG. 11a and FIG. 11b are SEM photographs of the sample shown in FIGS. 10a, b at a higher magnification showing the matrix also includes crystal phase surrounded by glassy phase, wherein FIG. 11a is at a magnification of X=15,000 and FIG. 11b is at a magnification of X=30,000.

DETAILED DESCRIPTION OF THE INVENTION

Figure 1:
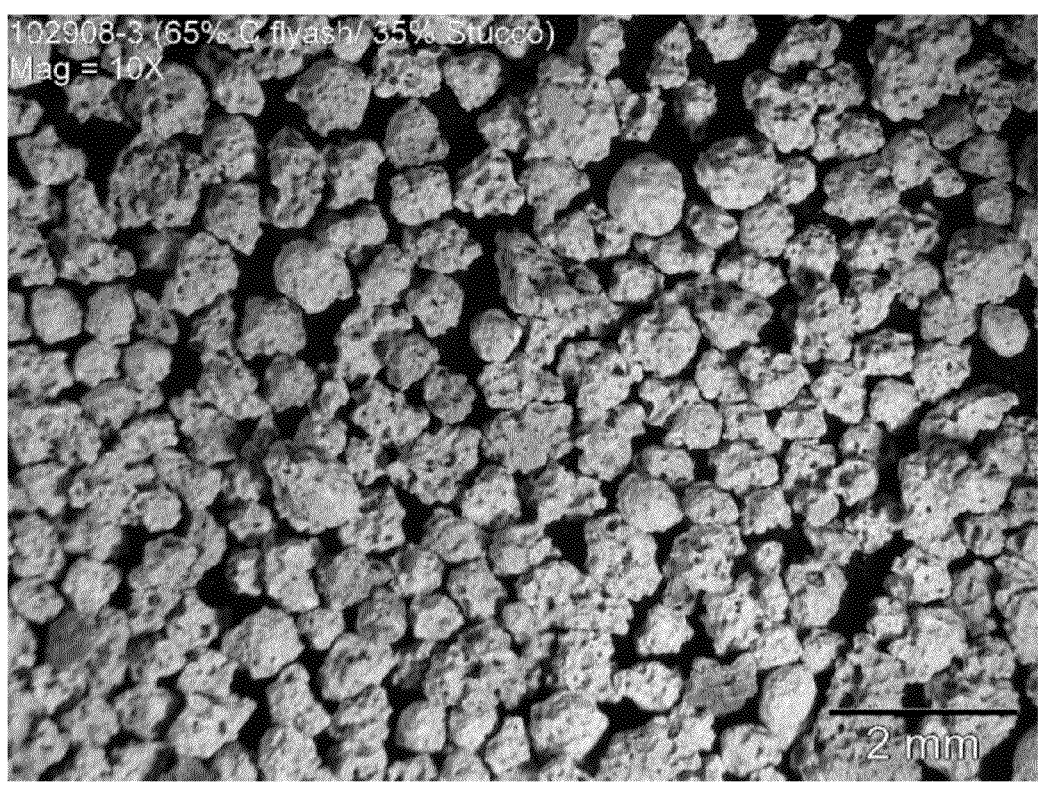
FIG. 1 is a photograph of a 10× magnification of the homogeneous particles of a mixture (#3) of 65% class C fly ash and 35% stucco.
Figure 2:
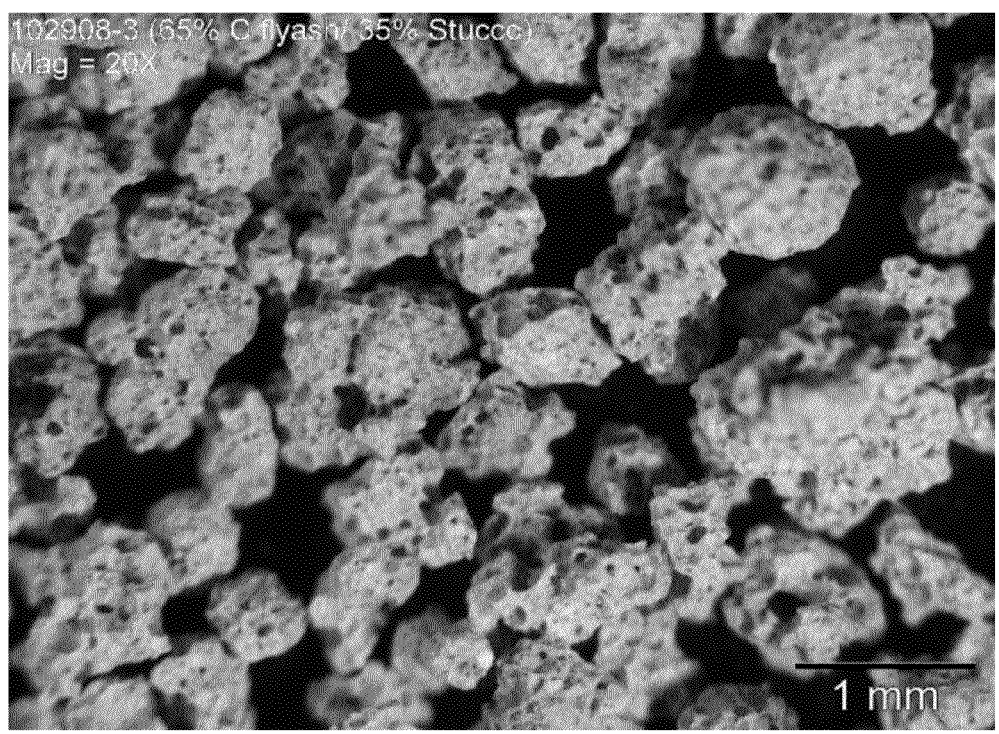
FIG. 2 is a photograph of a 20× magnification of the homogeneous particles of mixture (#3) of 65% class C fly ash and 35% stucco.
Figure 3:
FIG. 3 is a photograph of a 10× magnification of the wide distribution of particles of around 0.3 up to 2.0 mm in size in a mixture (#5) of 70% class C fly ash and 30% landplaster.
Figure 4:
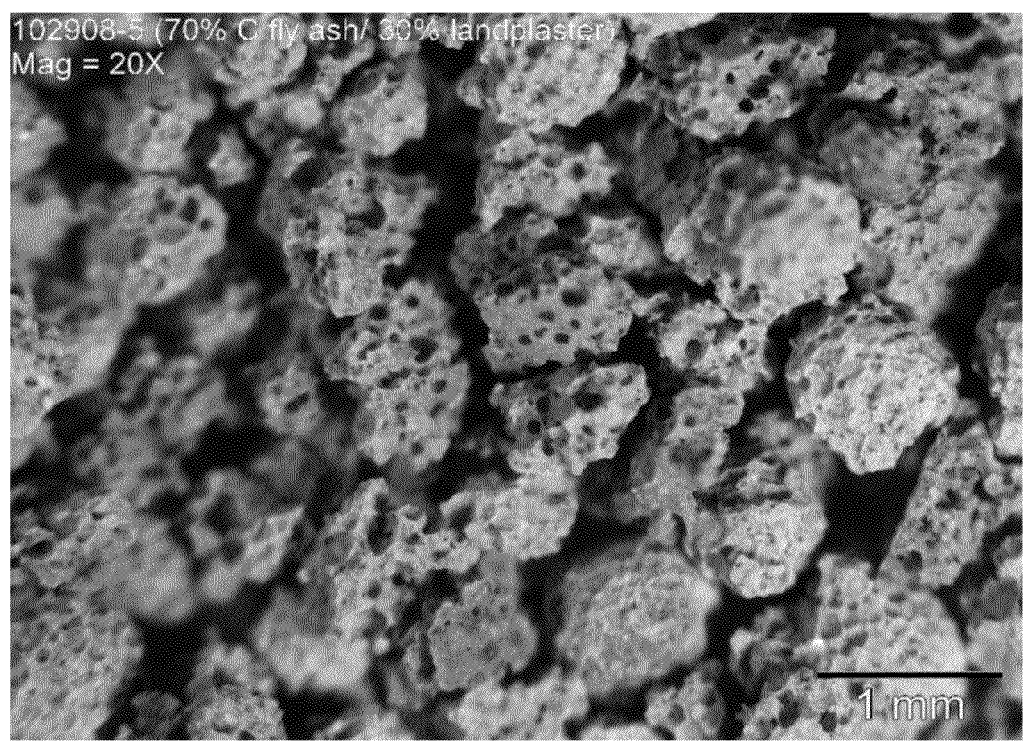
FIG. 4 is a photograph of a 20× magnification of the mixture (#5) of 70% class C fly ash and 30% landplaster, wherein the particles of about 1.0 mm are not as spherical in shape as the larger particles.
Figure 5:
FIG. 5 is a photograph of a 10× magnification of a mixture (#6) of 65% class C fly ash and 35% landplaster showing the particles have a distribution of particle sizes of about 1.0 up to 2.0 mm.
Figure 6:
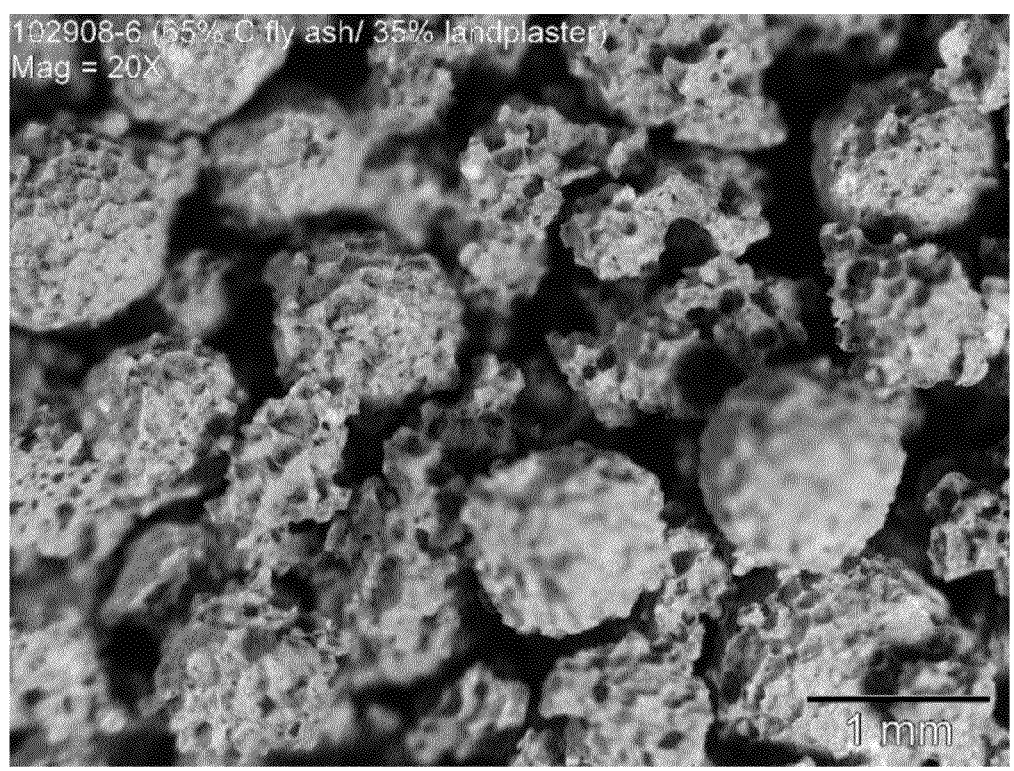
FIG. 6 is a photograph of a 20× magnification of mixture (#6) of 65% class C fly ash and 35% landplaster showing spherical particles of about 1 mm in size.

The present invention includes a method of providing a lightweight cementitious mixture having improved compressive strength and water durability comprising: mixing water, reactive powder, an alkali metal salt of citric acid, and in situ forming lightweight aggregate wherein the weight ratio of water to reactive powder solids is about 0.17 to 0.35:1.0, typically about 0.17 to 0.30:1.0, more preferably about 0.2 to 0.23:1.0. The reactive powder typically comprises 65 to 100 wt. % (or 75 to 100 wt. %) fly ash and 0 to 35 wt. % (or 0 to 25 wt. %) hydraulic cement and/or gypsum, typically a calcium sulfate selected from the group consisting of calcium sulfate hemihydrate, calcium sulfate dihydrate, and mixtures thereof. Typically the present invention mixes the cementitious reactive powder including fly ash with potassium citrates and/or sodium citrates and water at an initial slurry temperature of at least room temperature to 115° F. (24° C. to 41° C.) to yield a rapid set of preferably less than 10 to 13 minutes, more preferably about 4 to 6 minutes or less. The lightweight aggregate particles (nodules) form in situ in the cementitious mixture. Setting the cementitious mixture forms a solid product of the aggregate particles in a matrix of cementitious material (cementitious binder). The matrix being the portion of the cementitious material of the mixture that did not form aggregate particles (nodules). If desired this product of particles (nodules) formed in situ in a matrix of cementitious material can be crushed to form loose lightweight aggregate particles.

The present invention also provides cementitious compositions with enhanced rapid final setting performance and enhanced early compressive strength.

The typical ingredients of the composition for making the aggregate of the present invention are listed in the following TABLE A.

sulphoaluminate alkali hydrates and other hydrates present in the fly ash. Generally, the amount of water added will be greater than theoretically required for the hydration of the cementitious reactive powder. This increased water content facilitates the workability of the cementitious slurry. Typically, in the slurry the weight ratio of the water to reactive powder blend is about 0.20 to 0.35:1, more typically about 0.20 to 0.30:1, preferably about 0.20 to 0.23:1. The amount of water depends on the needs of the individual materials present in the cementitious composition.

The calcium sulphoaluminate hydrates and/or other hydrates of alumino silicate and/or calcium alumino silicate compounds form very rapidly in the hydration process thus imparting rapid set and rigidity to the aggregate particles The aggregate particles made this way will have a relatively low density because of the relatively large volume occupied by the needle like microstructure of the calcium sulphoaluminate minerals which are formed within a few minutes after the cementitious composition of the invention is mixed with a suitable amount of water.

Setting of the composition is characterized by initial and final set times, as measured using Gilmore needles specified in the ASTM C266 test procedure. The final set time also corresponds to the time when a concrete product, e.g., a concrete panel, has sufficiently hardened so that it can be

TABLE A

| Ingredient | Broad parts by weight dry basis per 100 parts reactive powder | Preferred parts by weight dry basis per 100 parts reactive powder | More preferred parts by weight dry basis per 100 parts reactive powder | Most preferred parts by weight dry basis per 100 parts reactive powder |
| --- | --- | --- | --- | --- |
| Reactive Powder (total) | 100 parts | 100 parts | 100 parts | 100 parts |
| Fly Ash (class C) | 50-95 | 60-95 | 65-80 | 65-75 |
| Class F Fly Ash | 0-30 | 0-20 | 0-20 | 0 |
| Portland Cement | 0-30 | 0-20 | 0-20 | 0 |
| Calcium sulfate dihydrate or hemihydrate (gypsum) | 5-40 | 5-40 | 20-40 | 25-35 |
| Calcium aluminate cement | Optional | None | None | |
| non-fly ash mineral additive | Optional | None | None | |
| added lime | Optional | None | None | |
| alkali metal salt of citric acid | 1.5 to 6 | 1.5 to 4 | 1.5 to 4 | 2.0 to 3.5 |
| Foam/air-entraining agent (alpha olefin sulfonate soap) | 2.0 to 6.0 | 3-5 | 3-5 | 4 |
| Polyvinyl alcohol stabilizer | optional | | | |
| Superplasticizer | optional | | | |

* added lime not needed if reactive powder ingredients already contain sufficient lime.

Generally the weight ratio of water to cementitious reactive powder is about 0.15 to 0.3:1.0. Inert lightweight aggregates are not part of the cementitious reactive powder.

While not wishing to be limited to a particular theory, it is theorized the lightweight aggregate particulates are formed as the calcium aluminate phases are leached out from the dissolving fly ash particles, with high fly ash mineral content of 75 to 100 wt % and no portland cement or calcium aluminate cement. The leaching out occurs after mixing the cementitious reactive powder, alkali metal citrate, calcium sulfate aggregate and water to form slurry at temperatures of about 20° C. so formation of calcium sulphoaluminate hydrates and/or hydrates of alumino silicate takes place as a result of the hydration of this reactive powder blend with the alkali metal citrate.

Thus, a suitable amount of water is provided to hydrate the cementitious reactive powder and to rapidly form calcium handled or trafficked, in the case of a concrete floor or road. Relatively higher early age (3 to 5 hours) compressive strength can be an advantage for concrete material because it can withstand higher stresses without deformation. It will be understood by those skilled in the art that curing reactions continue for extended periods after the final setting time has been reached.

Early age strength of the composition is characterized by measuring the compressive strength after 3 to 5 hours of curing as specified in the ASTM C109. Achieving high early strength allows for ease of handling the stacked panels.

Cementitious Reactive Powder

The cementitious reactive powder contains fly ash and optionally non-fly ash mineral additives which are mixed with a calcium sulfate particularly calcium sulfate dihydrate (stucco), calcium sulfate hemihydrate (gypsum or landplaster) or mixtures thereof. The cementitious reactive powder typically contains 65 to 100% fly ash, preferably Class C fly ash, and 0 to 35 wt. % of a member selected from the group consisting of calcium sulfate hemihydrate, gypsum and mixtures thereof with optional non-fly ash mineral additives. The cementitious reactive powder preferably contains 60-95 wt % fly ash, preferable class C fly ash, and 5-40 wt % calcium sulfate in the form of calcium sulfate hemihydrate and/or calcium sulfate dihydrate. In a more preferred reactive powder of the invention, the reactive powder comprises 65-75 wt % class C fly ash, 25-35 wt % calcium sulfate hydrates and no hydraulic cement.

Preferably the cementitious reactive powder contains 10 to 40 wt. % lime. However, this lime is generally not added lime. Rather it is included in another ingredient of the cementitious reactive powder, for example, the fly ash.

The principal ingredient of the cementitious reactive powder of the cementitious composition of the invention is a fly ash mineral additive, preferably Type C fly ash. Fly ash is described below in the section entitled Fly ash and Non-fly ash Mineral Additives.

In addition to fly ash, the cementitious reactive powder may include 0 to 25 wt. % of optional cementitious additives such as portland cement, calcium aluminate cement, calcium sulfate or gypsum (landplaster). However, the lower water content cementitious compositions of the invention, i.e. cementitious compositions with a water to reactive powder weight ratio of about 0.17 to 0.35:1.0, with these optional cementitious additives have a significantly reduced compressive strength compared to the same lower water content compositions of the invention without the additional cementitious additives.

For example, in some cementitious reactive powder blends when compressive strength is not required or when higher water to reactive powder ratios are to be used e.g. at ratios above about 0.35:1.0, portland cement can be used at about 0 to 25 wt % and fly ash 75 to 100 wt %.

Fly Ash and Non-Fly Ash Mineral Additives

The hydraulic cement of traditional reactive powder compositions is substantially replaced by fly ash having pozzolanic properties, particularly Class C fly ash although blends of Class C and Class F fly ash can be used without hydraulic cement provided the amount of class F fly ash is below 46 wt. % and preferably 30 wt % of the fly ash blend. Other optional non-fly ash mineral additives possessing substantial, little, or no cementing properties can be added. When added, non-fly ash mineral additives having pozzolanic properties are preferred in the cementitious reactive powder of the invention.

ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Various natural and man-made materials have been referred to as pozzolanic materials possessing pozzolanic properties. Some examples of pozzolanic materials include pumice, perlite, diatomaceous earth, silica fume, tuff, trass, rice husk, metakaolin, ground granulated blast furnace slag, and fly ash.

All of these pozzolanic materials can be used either singly or in combined form as part of the cementitious reactive powder of the invention.

Fly ash is the preferred pozzolan in the cementitious reactive powder blend of the invention. Fly ashes containing high calcium oxide and calcium aluminate content (such as Class C fly ashes of ASTM C618 standard) are preferred as explained below. Other mineral additives such as calcium carbonate, vermiculite, clays, and crushed mica may also be included as optional mineral additives.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 standard recognizes two major classes of fly ashes for use in concrete—Class C and Class F. These two classes of fly ashes are generally derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically have high calcium oxide (lime) content.

Class C fly ash usually has cementitious properties in addition to pozzolanic properties due to free lime (calcium oxide), whereas Class F is rarely cementitious when mixed with water alone. Presence of high calcium oxide content makes Class C fly ashes possess cementitious properties leading to the formation of calcium silicate and calcium aluminate hydrates when mixed with water. As will be seen in the examples below, Class C fly ash has been found to provide superior results, particularly in the preferred formulations in which calcium aluminate cement and gypsum are not used.

Typically at least 50 wt. % of the fly ash in the cementitious reactive powder is Type C fly ash. More typically at least 75-80 wt. % of the cementitious reactive powder is Type C fly ash. Still more preferably at least 88.5-100 wt. % of the cementitious reactive powder is Type C fly ash.

Typical minerals found in fly ash are quartz ($SiO_2$), mullite ($Al_2Si_2O_{13}$), gehlenite ($Ca_2Al_2SiO_7$), haematite ($Fe_2O_3$), magnetite ($Fe_3O_4$), among others. In addition, aluminum silicate polymorphs minerals commonly found in rocks such as sillimanite, kyanite and andalusite all three represented by molecular formula of $Al_2SiO_5$ are also found in fly ash.

A typical suitable Class C fly ash made from sub-bituminous coal has the following composition listed in TABLE B.

TABLE B

| Typical Class C fly ash Composition | |
|---|---|
| Component | Proportion (wt. %) |
| $SiO_2$ | 20-40 |
| $Al_2O_2$ | 10-30 |
| $Fe_2O_3$ | 3-10 |
| MgO | 0.5-8 |
| $SO_3$ | 1-8 |
| C | 0.5-2 |
| $H_2O$ | 0.33-3 |

TABLE B-continued

| Typical Class C fly ash Composition | |
|---|---|
| Component | Proportion (wt. %) |
| CaO | 25-35 |
| $K_2O$ | 0.5-4 |
| $Na_2O$ | 0.5-6 |

The fineness of the fly ash is typically such that less than about 34% is retained on a 325 mesh sieve (U.S. Series) as tested on ASTM Test Procedure C-311 ("Sampling and Testing Procedures for Fly Ash as Mineral Admixture for Portland Cement Concrete"). This fly ash is preferably recovered and used dry because of its self-setting nature.

A typical Class F fly ash which be used in the invention has the following composition listed in TABLE C.

TABLE C

| Typical Class F fly ash composition. | |
|---|---|
| Component | Proportion (wt. %) |
| $SiO_2$ | 50-65 |
| $Al_2O_2$ | 10-30 |
| $Fe_2O_3$ | 3-10 |
| MgO | 0.5-3 |
| $SO_3$ | 0.3-8 |
| C | 0.25-3 |
| $H_2O$ | 0.33-3 |
| CaO | 0-10 |
| $K_2O$ | 0.5-4 |
| $Na_2O$ | 1-6 |

The composition of a typical Portland Cement Type III which can be used in the present invention is shown in TABLE D

TABLE D

| Typical Portland Cement III | |
|---|---|
| Component | Proportion (wt.) |
| CaO | 61.04 |
| $Al_2O_2$ | 4.79 |
| $Fe_2O_3$ | 2.70 |
| $SiO_2$ | 19.62 |
| MgO | 2.62 |
| $SO_3$ | 4.80 |
| $K_2O$ | 1.06 |
| $Na_2O$ | 0.37 |
| $P_2O_5$ | 0.16 |
| $TiO_2$ | 0.27 |
| TOC (total organic carbon) | |
| LOI (950 C.) | 1.75 |
| Total | 99.35 |
| Estimated Cement Phases (Bogue) | |
| $C_3S$ (tricalcium silicate) | 49.73 |
| $C_2S$ (dicalcium silicate) | 18.73 |
| $C_3A$ (tricalcium aluminate) | 8.11 |
| $C_4AF$ (tetracalcium alumino-ferrite) | 8.21 |
| Alkali | 1.06 |

Fly ash makes up substantially all of the cementitious material of the reactive powder of the invention. The addition of other common cementitious additives are not needed with class C fly ash and have been found to reduce the ultimate compressive strength of the lightweight aggregate compositions of the invention.

In the case when Class F fly ash, which has substantially less alumina and lime content than class C fly ash, is used in place of a substantial amount or all of the Class C fly ash, it has been found the addition of Type III Portland cement is required to increase the compressive strength of the Class F fly ash binder to the levels obtained with the Class C fly ash based composition, which has substantially more alumina and lime content. In particular when up to 60 wt % Class F fly ash is used in the binder system, the addition of up to 30 wt % type III Portland cement increases the compressive strength of the binder more than three and a half times more than the addition of only class C fly ash to the Class F fly ash. Thus when class F fly ash is used in the present binder, the preferred mixture is about 46 to 60 wt % class F fly ash, 10 to 29 wt % Type III Portland Cement and 10 to 32 wt % Class C fly ash and 2 to 4 wt % sodium citrate with water. The ratio of water to fly ash and portland cement should be maintained below 0.37 and preferably below 0.33.

In the present invention, the need for the use of hydraulic cement, like Type III Portland cement can be avoided, and relatively fast early age strength development can be obtained using substantial all Class C fly ash instead of mixtures of Class F fly ash containing Type III portland cement. Other recognized types of cements which are not needed in the preferred Class C fly ash based composition of the invention include Type I portland cement or other hydraulic cements including Type II portland cement, white cement, slag cements such as blast-furnace slag cement, and pozzolan blended cements, expansive cements, calcium sulfo-aluminate cements, and oil-well cements.

Calcium Aluminate Cement

Calcium aluminate cement (CAC) is a type of hydraulic cement that may form a component of the reactive powder blend of some embodiments of the invention when higher compressive strength is not required with low water content slurries containing substantial amounts of fly ash.

Calcium aluminate cement (CAC) is also commonly referred to as aluminous cement or high alumina cement. Calcium aluminate cements have a high alumina content, about 36-42 wt % is typical. Higher purity calcium aluminate cements are also commercially available in which the alumina content can range as high as 80 wt %. These higher purity calcium aluminate cements tend to be very expensive relative to other cements. The calcium aluminate cements used in the compositions of some embodiments of the invention are finely ground to facilitate entry of the aluminates into the aqueous phase so that rapid formation of ettringite and other calcium aluminate hydrates can take place. The surface area of the calcium aluminate cement that may be used in some embodiments of the composition of the invention will be greater than 3,000 $cm^2$/gram and typically about 4,000 to 6,000 $cm^2$/gram as measured by the Blaine surface area method (ASTM C 204).

Several manufacturing methods have emerged to produce calcium aluminate cement worldwide. Typically, the main raw materials used in the manufacturing of calcium aluminate cement are bauxite and limestone. One manufacturing method that has been used in the US for producing calcium aluminate cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. This granulate is then ground to the desired fineness to produce the final cement.

Several calcium aluminate compounds are formed during the manufacturing process of calcium aluminate cement. The predominant compound formed is monocalcium aluminate ($CaO.Al_2O_3$, also referred to as CA). The other calcium aluminate and calcium silicate compounds that are formed include $12CaO.7Al_2O_3$ also referred to as $C_{12}A_7$, $CaO.2Al_2O_3$ also referred as $CA_2$, dicalcium silicate ($2CaO.SiO_2$, called $C_2S$), dicalcium alumina silicate ($2CaO.Al_2O_3.SiO_2$, called $C_2AS$). Several other compounds containing relatively high proportion of iron oxides are also formed. These include calcium ferrites such as $CaO.Fe_2O_3$ or CF and $2CaO.Fe_2O_3$ or $C_2F$, and calcium alumino-ferrites such as tetracalcium aluminoferrite ($4CaO.Al_2O_3.Fe_2O_3$ or $C_4AF$), $6CaO.Al_2O_3.2Fe_2O_3$ or $C_6AF_2$) and $6CaO.2Al_2O_3.Fe_2O_3$ or $C_6A_2F$). Other minor constituents present in the calcium aluminate cement include magnesia (MgO), titanic ($TiO_2$), sulfates and alkalis.

Calcium Sulfate

Various forms of calcium sulfate as shown below may be used in the invention to provide sulfate ions for forming ettringite and other calcium sulfo-aluminate hydrate compounds:

Dihydrate—$CaSO_4.2H_2O$ (commonly known as gypsum or landplaster)

Hemihydrate—$CaSO_4.\frac{1}{2}H_2O$ (commonly known as stucco, plaster of Paris or simply plaster)

Anhydrite—$CaSO_4$ (also referred to as anhydrous calcium sulfate)

Landplaster is a relatively low purity gypsum and can be used for economic considerations, when greater compressive strength is not critical. Higher purity grades of gypsum could also be used. Landplaster is made from quarried gypsum and ground to relatively small particles such that the specific surface area is greater than 2,000 $cm^2$/gram and typically about 4,000 to 6,000 $cm^2$/gram as measured by the Blaine surface area method (ASTM C 204). The fine particles are readily dissolved and supply the gypsum needed to form ettringite. Synthetic gypsum obtained as a by-product from various manufacturing industries can also be used as an acceptable form of calcium sulfate in the present invention. The other form of anhydrous calcium sulfate may also be used in the present invention instead of the preferred hemihydrate or gypsum.

Alkali Metal Salts of Citric Acid

In the present invention, use of alkali metal salts of citric acid such as sodium or potassium citrate, makes mixes with relatively good fluidity and which do not stiffen too quickly, i.e., do not stiffen faster than 5-10 minutes after mixing at temperatures above room temperature, while achieving good early age compressive strength.

The dosage of alkali metal salt of citric acid, e.g. potassium citrate or sodium citrates, is about 1.5 to 6.0 wt. %, preferably about 1.5 to 4.0 wt. %, more preferably about 2.0 to 3.5 wt. % and most preferably about 3.5 wt % based on 100 parts of the cementitious reactive components of the invention. Thus for example, for 100 pounds of cementitious reactive powder, there may be about 1.5 to 4.0 total pounds of potassium and/or sodium citrates. The preferred alkali metal citrates are potassium citrates and sodium citrates and particularly tri-potassium citrate monohydrate and tri-sodium citrate monohydrate.

The use of the alkali metal salts of citric acid e.g., sodium or potassium citrate, also provides for good fluidity and prevents the slurry from stiffening too quickly. Thus the use of retarders like citric acid, tartaric acid, malic acid, acetic acid, boric acid, etc. can be avoided.

Air Entraining Agents and Superplasticizers

Air entraining agents are added to the cementitious slurry of the invention to form air bubbles (foam) in situ. Air entraining agents are typically surfactants used to purposely trap microscopic air bubbles in the concrete. Alternatively, air entraining agents are employed to externally produce foam which is introduced into the mixtures of the compositions of the invention during the mixing operation to trap needle shape hydration products in the bubbles to produce a lightweight aggregate product. Typically to externally produce foam the air entraining agent (also known as a liquid foaming agent), air and water are mixed to form foam in a suitable foam generating apparatus.

Alpha-olefin sulfonate is a type of anionic surfactant processed by alpha-olefin gas-phase sulfonation and continuous neutralization. Advantages of the use of this sulfonate include good compatibility, rich and fine foam, easy biodegradation, low toxicity and low irritation to skin. WITCONATE™ AOS manufactured by Akzo Nobel was found to be effective in laboratory testing to be highly effective in foaming fly ash and sodium citrate binders to produce the aggregate product of this invention.

While the use of the AOS soap is preferred, other examples of air entraining/foaming agents that can be used include alkyl sulfonates, alkylbenzolfulfonates and alkyl ether sulfate oligomers among others. Details of the general formula for these foaming agents can be found in U.S. Pat. No. 5,643,510 incorporated herein by reference.

An air entraining agent (foaming agent) such as that conforming to standards as set forth in ASTM C 260 "Standard Specification for Air-Entraining Admixtures for Concrete" (Aug. 1, 2006) can be employed. Such air entraining agents are well known to those skilled in the art and are described in the Kosmatka et al "Design and Control of Concrete Mixtures," Fourteenth Edition, Portland Cement Association, specifically Chapter 8 entitled, "Air Entrained Concrete," (cited in US Patent Application Publication No. 2007/0079733 A1). Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl(phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof.

Typically the air entraining (foaming) agent is present at about 0.01 to 1.0 wt. % based upon the weight of the overall cementitious composition.

Although conventional superplasticizers can be used, there use is optional. It has been found superplasticizers are not needed in the current invention, since reduced water demand of the mixture is achieved with the use of the alkali metal citrates of the invention.

Initial Slurry Temperature

In the present invention, slurry is formed to make the composition for setting in situ to form aggregate of the present invention, which is subsequent recovered from the set composition by suitable recovery process, such as by crushing or scraping of the set mixture. Forming the slurry under conditions which provide an initially high slurry temperature was found to be important to achieve rapid hardening of the cementitious formulations used to make the aggregate particles. The initial slurry temperature should be at about room temperature to about 41° C. Slurry temperatures in the range of 38° C. to 41° C. produce short setting times, and are therefore preferred.

In general, within this range increasing the initial temperature of the slurry increases the rate of temperature rise as the reactions proceed and reduces the setting time. Thus, an initial slurry temperature of 95° F. (35° C.) is preferred over an initial slurry temperature of 90° F. (32.2° C.), a temperature of 100° F. (37.7° C.) is preferred over 95° F. (35° C.), a temperature of 115° F. (41.1° C.) is preferred over 100° F. (37.7° C.), a temperature of 110° F. (40.6° C.) is preferred over 115° F. (41.1° C.) and so on. It is believed the benefits of increasing the initial slurry temperature decrease as the upper end of the broad temperature range is approached.

As will be understood by those skilled in the art, achieving an initial slurry temperature may be accomplished by more than one method. Perhaps the most convenient method is to heat one or more of the components of the slurry. In the examples, the present inventors supplied water heated to a temperature such that, when added to the dry reactive powders and unreactive solids, the resulting slurry is at the desired temperature. Alternatively, if desired the solids could be provided at above ambient temperatures. Using steam to provide heat to the slurry is another possible method that could be adopted.

Although potentially slower, a slurry could be prepared at ambient temperatures, and promptly (e.g., within about 10, 5, 2 or 1 minutes) heated to raise the temperature to about 90° F. or higher (or any of the other above-listed ranges), and still achieve benefits of the present invention.

Manufacturing Lightweight Aggregate of the Present Invention.

The aggregate of the present invention is formed by a method comprising, providing a lightweight cementitious mixture for making aggregate particles, said providing comprising forming a mixture by mixing water, cementitious reactive powder comprising fly ash and a calcium sulfate selected from the group consisting of calcium sulfate hemihydrate, calcium sulfate dihydrate, and mixture thereof, an alkali metal salt of citric acid selected from the group consisting of sodium citrate, potassium citrate and mixtures thereof, and a foaming agent, wherein the aggregate particles comprising fly ash are formed in situ in the mixture.

Once the slurry of the lightweight cementitious mixture is set in situ, the aggregate of the invention is recovered from the set mixture by use of a suitable recovery process, for example by crushing or scraping the set mixture to separate the aggregate particles from the set mixture.

One method used for entraining air in the fly ash binders is by adding the foaming admixtures, i.e. alpha olefin sulfonate (AOS) soap, to the fly ash binders and generate the bubbles or air pockets in-situ while the fly ash binders were mixed for a predetermined amount of time.

The following foamed fly ash aggregate compositions described herein contain 75-80.5% fly ash, 3 to 6% sodium (or potassium) citrate, 14 to 20% water and 0.4 to 0.7% foaming agent as percent of the total composition. The sodium citrate can be replaced with potassium citrate or a blend of both citrates can be used. The preferred foaming agent is stable soap made of long carbon chain ($C_{12}$-$C_{16}$) such as alpha olefin sulfonates and contain no ammonia to prevent the unwanted ammonia smell as the reaction is taking place during the mixing operation.

The successful production of the foamed fly ash binders for the lightweight aggregate of the invention optimizes the two following parameters:
(a) Reaction rate of the fly ash binders, and
(b) Method for introducing foam to the fly ash/sodium citrate binder.

Water, sodium citrate and foaming agent are first mixed homogeneously. These ingredients are added to the fly ash reactive powder. Foaming of this mixture starts immediately and is complete within 3 to 6 minutes. The mixture temperature rise starts soon after mixing, indicating an exothermic reaction as described in previous patent application by the author. Hardening at room temperature continues for the first 24 hr and final strength achieved within few days. The in-situ foam binders formed this presents a unique combination of low weight associated with improved compressive strengths.

The above components were combined using a weight ratio of water to reactive powder (fly ash) of 0.18/1 to 0.23. The microstructure of the mixes was analyzed using a scanning electron microscope.

The wet density of the resulting mixture is within the range of about 40 to 65 pounds per cubic foot, and more preferably about 46 to 51 pounds per cubic foot.

Manufacturing of Cementitious Products Using Lightweight Aggregate of the Invention Lightweight aggregates such as blast furnace slag, volcanic tuff, pumice, expanded clay, shale, and perlite, hollow ceramic spheres, hollow plastic spheres, expanded plastic beads, and the like are conventionally used for the manufacture of lightweight concrete products.

Conventional expanded clay lightweight aggregates are also used in precast concrete products such as cement boards which are made under relatively high temperature conditions between 1200° to 2100° F. in a rotary kiln. This process, known as "pyroprocessing" causes the clay material to expand into a synthetic lightweight aggregate having a typical bulk loose density of 40 to 65 pounds per cubic foot.

Precast concrete products such as cement boards are manufactured most efficiently in a continuous process in which a reactive cementitious powder blend is blended with the lightweight aggregate of the present invention, with other necessary ingredients, followed by addition of water and other chemical additives just prior to placing the mixture in a mold or over a continuous casting and forming belt.

Due to the rapid setting characteristics of the cementitious mixture it should be appreciated that the mixing of dry components of the cementitious reactive powder blend and present lightweight aggregate with water usually will be done just prior to the casting operation. As a consequence of the formation of the alkali alumino silicate hydrates and/or other hydrates of alumino silicates and/or calcium alumino silicate compounds, the concrete product becomes rigid, ready for further processing and curing.

The products of the invention therefore also comprise cementitious compositions comprising the lightweight aggregate of an essentially homogeneous mixture of spherical shaped particles of fly ash based cementitious material and calcium sulfate of the invention and a binder of cementitious material, with the aggregate being distributed within the cementitious material.

EXAMPLE

The following example illustrates the influence of adding calcium sulfate dihydrate (landplaster) to the composition of the invention including a mixture of class C fly ash and sodium citrate, on the microstructure of the resulting binder which is used in the formation of individual lightweight aggregate particles of the invention.

Example 1

Compositions including, a mixture of class C fly ash, and calcium sulfate dihydrate (landplaster) or calcium sulfate hemihydrate (stucco) were used as the components of the reactive powder. The admixtures used were sodium citrate and a surfactant added as aqueous solutions. The above components were combined using a weight ratio of water to reactive powder (fly ash plus calcium sulfate) of 0.2/1 to 0.287 depending on the water demand of the calcium hemihydrate material. The microstructure of the mixes and the size of the lightweight aggregate were analyzed using an optical microscope and SEM. Spherical aggregate particles are visible intermixed in the concrete mix substantially immediately after mixing.

Granule samples were collected after the mixtures were harden by carefully scraping these from few centimeters at the top surface of the harden mixtures. To study the specimens at relatively low magnification (FIGS. 1-6) optical images were captured through a computer attached to an Olympus SZX16 Research Stereo Microscope equipped with a DP71 CCD camera. To study the microstructure of the aggregate particles at high magnification (FIGS. 7-11) each sample was mounted on sample holders and gold coated under vacuum and analyzed using a JEOL Model JSM-840A scanning electron microscope (SEM), made by JEOL USA, Inc., Peabody, Mass.

A solution containing 15 to 35% sodium citrate was made by stirring until the powdered sodium citrate dissolved. A foaming agent of 3-6% alpha olefin sulfonate soap (AOS) (Witconate AOS brand soap from Akzo Nobel Company) was then added. Upon addition of the foaming agent, the viscosity of the sodium citrate solution increased significantly, indicating a synergistic interaction between the sodium citrate and the soap. The sodium citrate/soap solution was then added to blends of class C fly ash and calcium sulfate dihydrate (gypsum/landplaster) or calcium sulfate hemihydrate (stucco) and mixed in a Hobart brand mixer at low medium speed for about 4-6 minutes at room temperature with no heating.

This example shows the effect of using class C fly ash blended with calcium sulfate dihydrate (stucco) compared to class C fly ash blended with calcium sulfate hemihydrate (gypsum/landplaster) on the aggregate particles obtained by the above-mentioned mixing procedure.

TABLE E shows the six compositions used in this example. In TABLE E, "g" means grams and W/S means the weight ratio of water to reactive powder (fly ash plus calcium sulfate). The wet density measured for these mixes ranged from about 46 to 51 pcf (pounds per cubic foot).

FIGS. 1-6 show the aggregate particles at 10× and 20× magnifications for mixes 3, 5 and 6. The honeycomb surface of the aggregate particles is shown in the figures. The pictures in FIGS. 1 and 2 for mix 3 containing a blend of 65% class C fly ash and 35% stucco show relatively homogeneous particles around 1 mm or less in size. By contrast, the pictures in FIGS. 3 and 4 for mix 5 containing a blend of 70% class C fly ash and 30% landplaster and FIGS. 5 and 6 for mix #6 containing a blend of 65% class C fly ash and 35% landplaster show a wide distribution of particles of from about 0.3 to 2 mm in size, with most particles being less than 1 mm in size. Thus relatively homogeneous smaller particles are obtained when stucco is used in the blend with the class C fly ash instead of landplaster.

Figure 7:
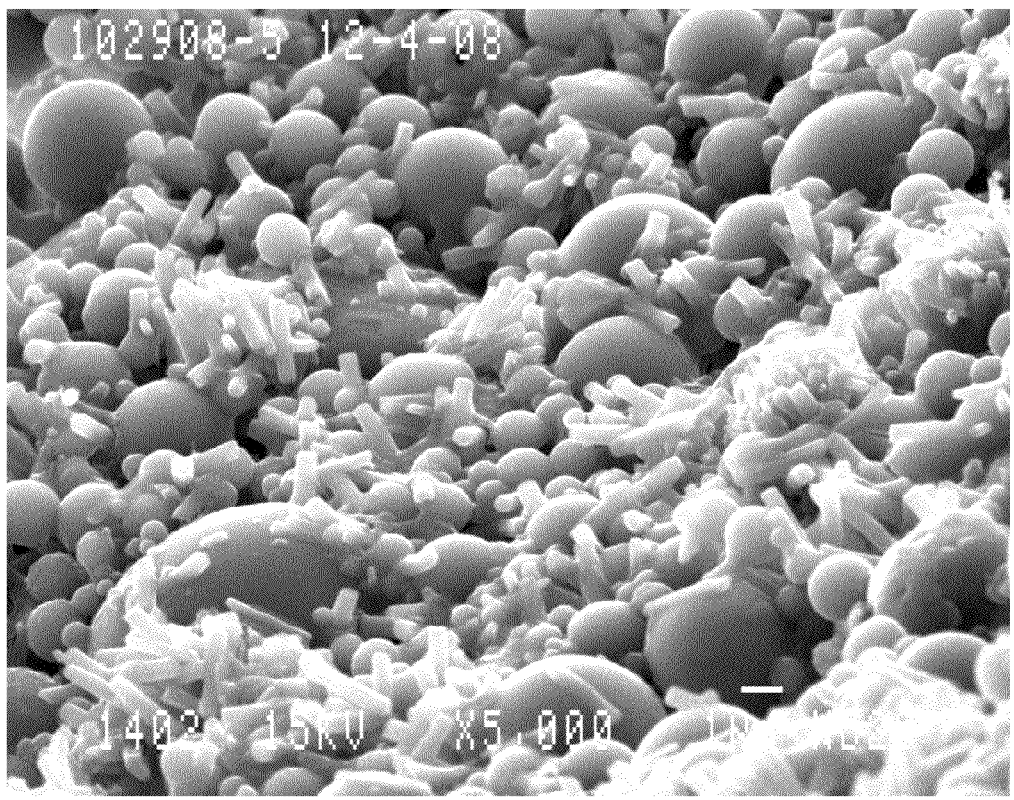
FIG. 7 is a SEM (scanning electron microscope) photograph which shows matrix fly ash particles surrounded by mostly crystalline phase with relatively less of the glassy phase for a sample of 70% Class C Fly ash 30% Gypsum, 4.5% sodium citrate W/FA=0.20, R.T. Wet density=50 pcf, Witconate AOS soap, made by mixing soap and sodium citrate solution with fly ash for about 3 minutes.
Figure 8A:
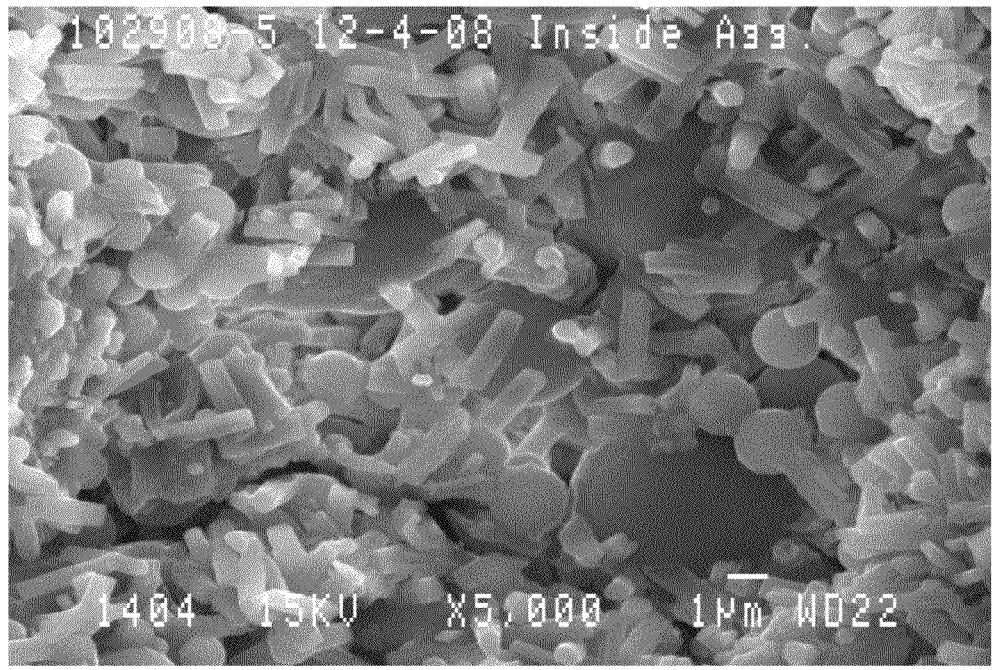
Figure 8B:
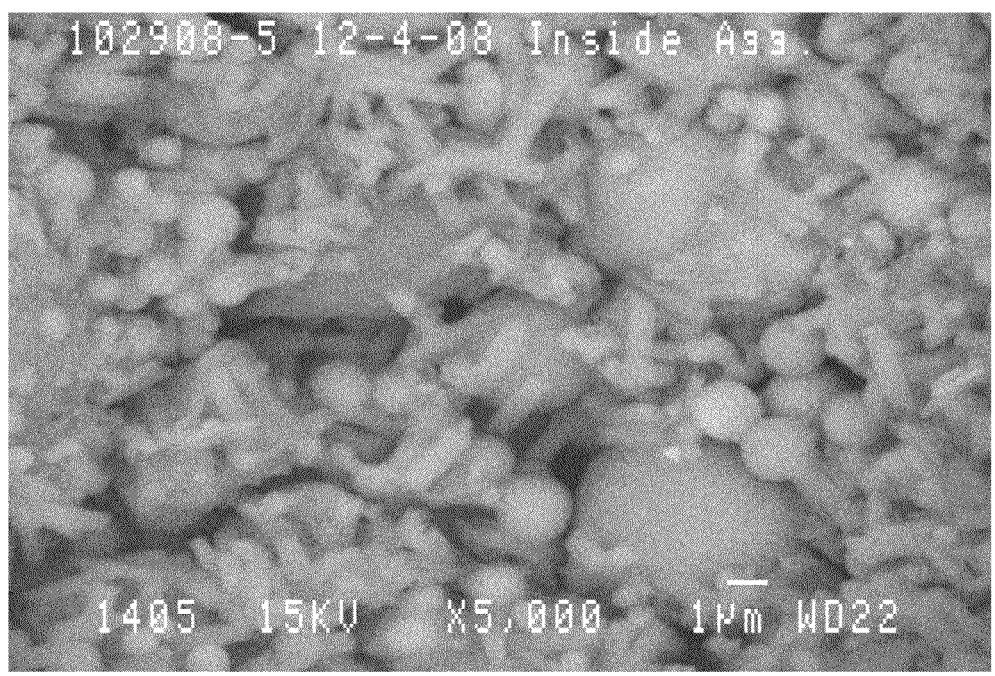
Figure 9:
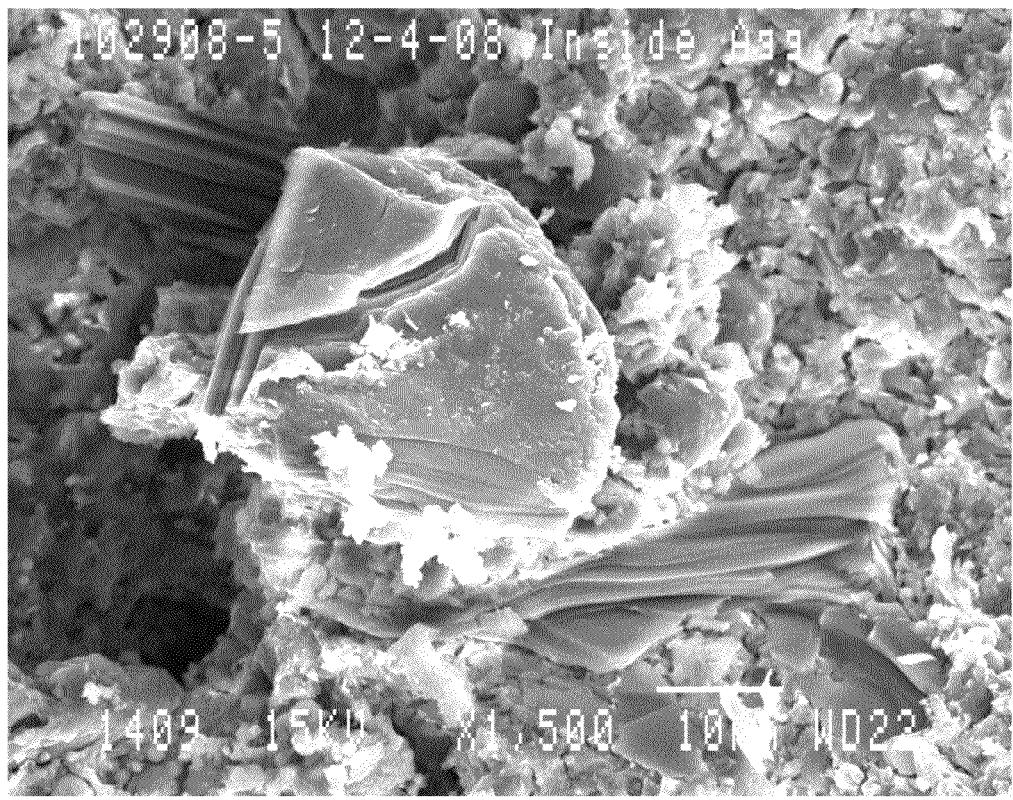
FIG. 9 is a SEM photograph showing gypsum encapsulated inside aggregate particle (same particle shown in FIG. 8a, b).
Figure 10A:
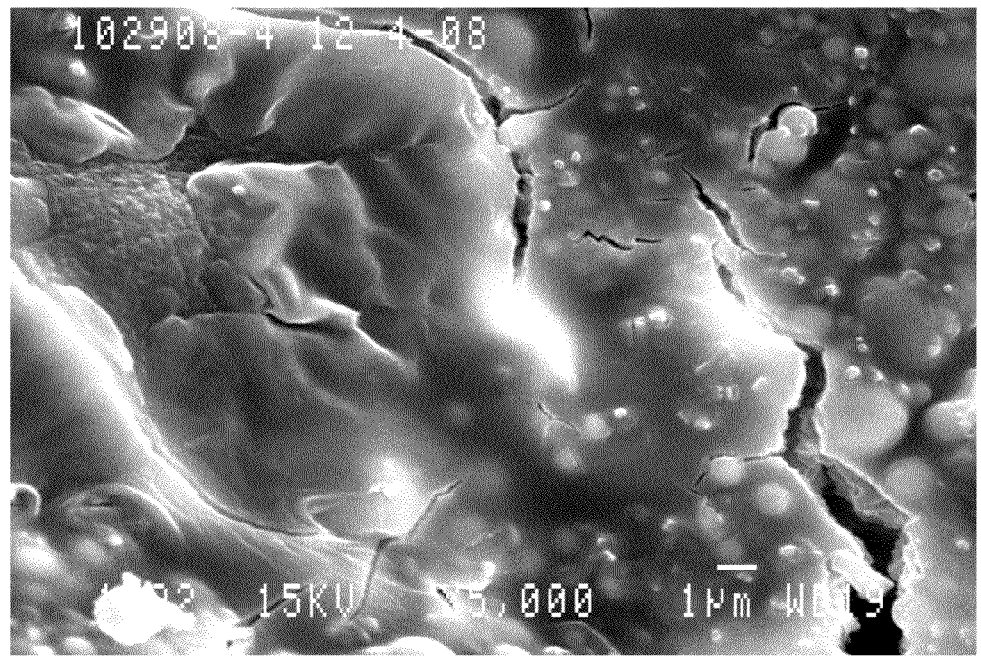
FIG. 10a and FIG. 10b are SEM photographs of a matrix composed of glassy phase with nanoparticles immersed in it for a sample having an analysis of 100% Class C Fly ash, 0% Gypsum, 4.5% sodium citrate, W/FA=0.20, R.T. Wet density=47 pcf, Witconate AOS soap, made by mixing soap and sodium citrate solution with fly ash for about 3 minutes.
Figure 10B:
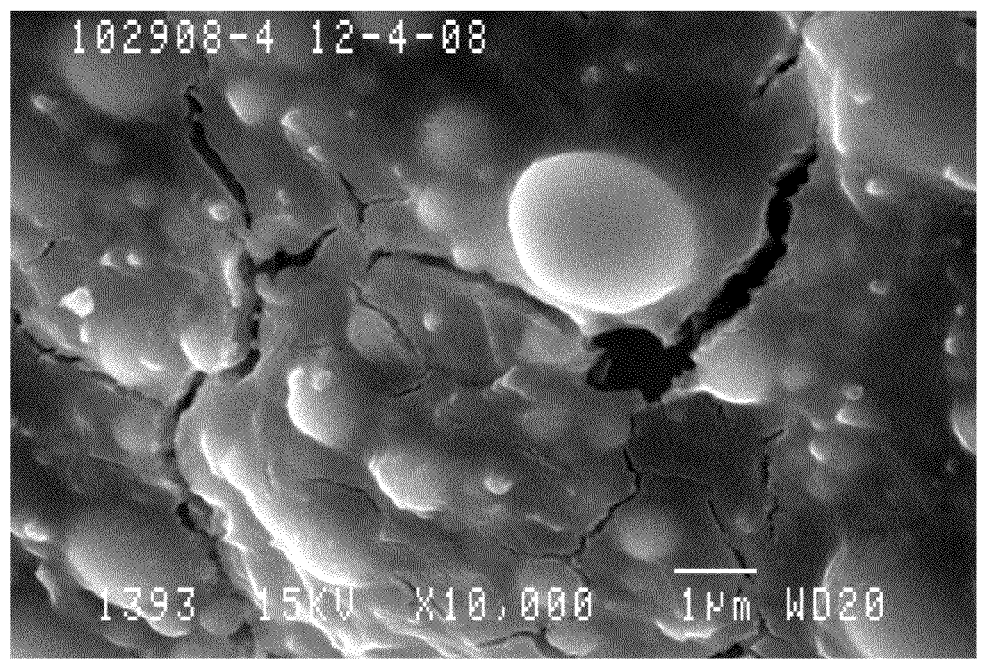
Figure 11A:
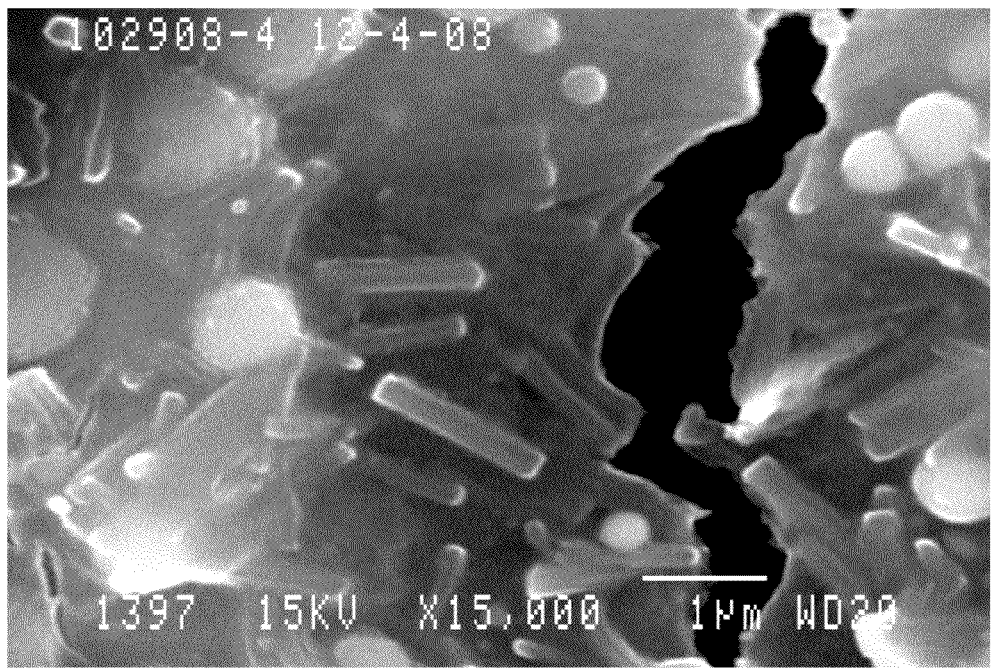
Figure 11B:
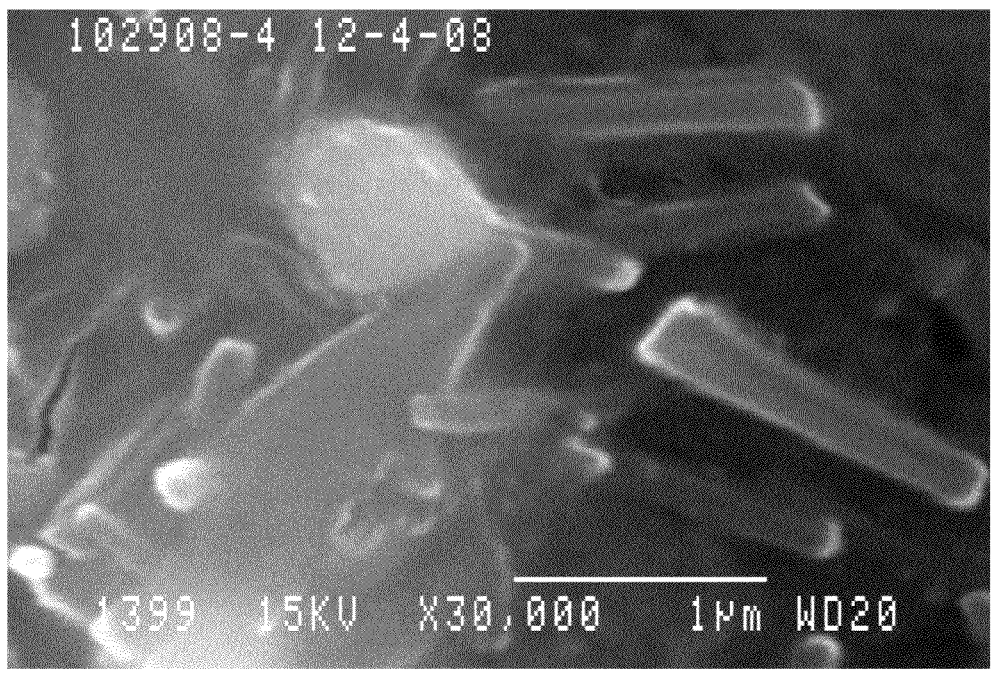

The photographs in FIGS. 7-11 show SEM (scanning electron microscope) pictures with the characteristic microstructure of the cementitious binder and the aggregate particles formed using compositions shown in Table 1 for Mix 5 (FIGS. 7-9) and Mix 4 (FIGS. 10a, 10b, 11a and 11b). FIGS. 7, 8a, and 8b show the microstructure inside the aggregate particles (FIGS. 8a, b) is similar to the microstructure in the matrix outside the aggregate. FIGS. 8a and 8b further show the detailed microstructure of the aggregate particles in FIG. 6 in which the aggregate particles comprising the fly ash and calcium sulfate formed in situ in the mixture also comprises a crystalline structure of hydration products formed in situ from the reaction of the dissolution of some of the aluminates in the fly ash and calcium sulfate phase, which are also formed and interspersed within and between the aggregate particles to interlock or bind the aggregate particles together to form the unique aggregate of this invention. FIG. 9 shows some of the gypsum particles were trapped inside the aggregate particles. Thus, it appears the aggregate particles formed because some of the gypsum particles did not have time to go into solution.

In the case where there was no gypsum or stucco present, as in the case of Mix 4, there was a mostly glassy matrix without the abundance of relatively large crystals shown in FIGS. 7 and 8a and 8b for Mix 5, which contained gypsum. Only a small amount of crystalline phase is found at the relatively higher 20× magnification in the photographs of FIGS. 11a and 11b.

Although the preferred embodiments for implementing the present invention are described above, it will be understood by those skilled in the art to which this disclosure is directed that modifications and additions may be made to the present invention without departing from its spirit and scope.

TABLE E

| Mix | Class C Fly Ash[1] g | Stucco[2] g | Landplaster[3] g | $H_2O$ g | Extra $H_2O$ g | Na Citrate g | AOS soap g | W/S | Wet Density Pcf. |
|---|---|---|---|---|---|---|---|---|---|
| 1 | 800 | 200 | 0 | 150 | 79 | 45 | 7.5 | 0.229 | 48.2 |
| 2 | 700 | 300 | 0 | 150 | 107 | 45 | 7.5 | 0.257 | 47.4 |
| 3 | 650 | 350 | 0 | 150 | 137 | 45 | 7.5 | 0.287 | 50.9 |
| 4 | 1000 | 0 | 0 | 150 | 50 | 45 | 7.5 | 0.2 | 46.9 |
| 5 | 700 | 0 | 300 | 150 | 50 | 45 | 7.5 | 0.2 | 49.9 |
| 6 | 650 | 0 | 300 | 150 | 50 | 45 | 7.5 | 0.2 | 45.9 |

[1]Campbell Class C fly ash,
[2]CKS Stucco-Southard,
[3]Detroit Landplaster

I claim:

1. A loose aggregate composition consisting of loose aggregate particles separated from a mixture of ingredients: the mixture consisting of:
   water, cementitious reactive powder consisting of fly ash and a calcium sulfate selected from the group consisting of calcium sulfate hemihydrate, calcium sulfate dihydrate, and mixtures thereof, and optional silica fume,
   an alkali metal salt of citric acid selected from the group consisting of sodium citrate, potassium citrate and mixtures thereof,
   a foaming agent,
   optionally at least one or more members selected from the group consisting of secondary aggregate other than said loose aggregate, superplasticizer, set accelerating agents other than said alkali metal salt of citric acid, set retarding agents, shrinkage control agents, thickening agents, coloring agents, and internal curing agents, and
   aggregate particles consisting of the fly ash and calcium sulfate in the mixture and crystalline hydration products of the fly ash and calcium sulfate which are interspersed within and between the aggregate particles to bind the aggregate particles.

2. The composition of claim 1, wherein the wet density of the resulting mixture is about 40 to 65 pounds per cubic foot, wherein the mixture has no other hydraulic cement, and the ingredients consisting essentially of the water, the cementitious reactive powder, the alkali metal salt of citric acid, and the foaming agent.

3. The composition of claim 1, wherein the fly ash in the reactive powder comprises 88.5 to 100% class C fly ash, and the calcium sulfate is calcium sulfate dihydrate.

4. The composition of claim 1, wherein the fly ash of the cementitious reactive powder consists of 30-46 wt % class F fly ash and 54-70 wt % class C fly ash and the mixture has no portland cement and no other hydraulic cement.

5. The composition of claim 1, wherein the cementitious reactive powder is selected from the group consisting of class C fly ash and calcium sulfate hemihydrate or stucco, mixtures of class C and class F fly ash, calcium sulfate hemihydrate or stucco and/or Portland cement and mixtures of class F fly ash with class C fly ash and/or Portland cement and calcium sulfate hemihydrate or stucco.

6. The composition of claim 1, wherein the cementitious reactive powder consists of 46 to 60 wt. % Class F fly ash, 10 to 32 wt. % Class C fly ash, and 10-29 wt % calcium sulfate hemihydrate or stucco and wherein the weight ratio of water to the total weight of fly ash and calcium sulphate is less than about 0.33 to 0.37.

7. The composition of claim 1, wherein the alkali metal salt of citric acid is in an amount of about 1.5 to 6 wt. % based on the weight of the cementitious reactive powder.

8. The composition of claim 1, wherein the cementitious reactive powder consists essentially of 60 to 95 wt. % fly ash and 5 to 40 wt. % calcium sulfate selected from the group consisting of calcium sulfate hemihydrate, calcium sulfate dihydrate, and mixtures thereof.

9. The composition of claim 1, wherein the reactive powder includes the silica fume and has no Portland cement and no calcium aluminate cement, wherein the mixture has no other hydraulic cement, wherein the ingredients consist of water, the cementitious reactive powder, the alkali metal salt, and the foaming agent.

10. The composition of claim 1, wherein the cementitious reactive powder and water are present in a weight ratio of about 0.200 to 0.287:1 part by weight water to reactive powder.

11. The composition of claim 1, wherein the cementitious reactive powder and water are present in a weight ratio of about 0.22-0.287:1 part by weight water to reactive powder, wherein the cementitious reactive powder consists of fly ash which is 88.5 to 100 wt. % Class C fly ash, calcium sulfate, optional silica fume and no Portland cement and no other hydraulic cement.

12. A composition of a lightweight cementitious mixture for forming an aggregate consisting of a mixture of:
   a cementitious reactive powder consisting of 60 to 95 wt. % fly ash, and a calcium sulfate selected from the group consisting of calcium sulfate dihydrate, calcium sulfate hemihydrate, and mixtures thereof;
   an alkali metal salt of citric acid, as an accelerator for the reactive powder;
   a foaming agent; and
   water,
   wherein aggregate particles comprising the fly ash and calcium sulfate are formed in situ in the mixture with a crystalline form of hydration products, of fly ash and calcium sulfate which are also formed in situ and interspersed within and between the aggregate particle to bind the aggregate particles, and
   wherein the ratio of water to cementitious reactive powder solids in the mixture is about 0.17 to 0.35:1.

13. The composition of claim 12, wherein the reactive powder consists of fly ash comprising 88.5 to 100 wt. % Class C fly ash, calcium sulfate, optional silica fume and no Portland cement and no other hydraulic cement.

14. The composition of claim 12, wherein the mixture has about 1.5 to 6.0 wt. %, based upon the weight of cementitious powder, of at least one alkali metal salt of citric acid selected from the group consisting of sodium citrates, potassium citrates and mixtures thereof.

15. The composition of claim 12, wherein the cementitious reactive powder is selected from the group consisting of class C fly ash and calcium sulfate hemihydrate or stucco, mixtures of class C and class F fly ash and calcium sulfate hemihydrate or stucco; and mixtures of class F fly ash with class C fly ash and/or Portland cement and calcium sulfate hemihydrate stucco.

16. The composition of claim 12, wherein the cementitious reactive powder mixture consists of 30-46 wt % class F fly ash and 54-70 wt % class C fly ash and no portland cement and no other hydraulic cement.

17. The composition of claim 12, wherein the cementitious reactive powder consists of 46 to 60 wt. % Class F fly ash, 10 to 32 wt. % Class C fly ash, and 10-29 wt % calcium sulfate hemihydrate or stucco and wherein the weight ratio of water to the total weight of fly ash and calcium sulphate is less than about 0.33 to 0.37.

18. A composition consisting of a lightweight cementitious aggregate, the comprising consisting of an essentially homogeneous mixture of spherical shaped particles of fly ash based cementitious material and a calcium sulfate having a diameter of less than about 1 mm and a crystalline form of hydration products, of the fly ash and calcium sulfate which are also formed and interspersed in and between the particles and which bind the particles together in the aggregate and an optional binder of cementitious material.

19. The composition of claim 18, further a having the binder of cementitious material, wherein the aggregate is distributed within the cementitious material.

* * * * *

UNITED STATES PATENT AND TRADEMARK OFFICE
CERTIFICATE OF CORRECTION

PATENT NO. : 9,090,506 B2  
APPLICATION NO. : 14/317769  
DATED : July 28, 2015  
INVENTOR(S) : Marianela Perez-Pena It is certified that error appears in the above-identified patent and that said Letters Patent is hereby corrected as shown below:

In the Claims

Claim 18, Column 20, Line 56 should read: "aggregate, the composition consisting of an essentially homo-"

Signed and Sealed this
Sixteenth Day of August, 2016

Michelle K. Lee
*Director of the United States Patent and Trademark Office*